United States Patent [19]
Behrendt

[11] 3,834,261
[45] Sept. 10, 1974

[54] HORIZONTALLY ACTING EXTRUSION DISCARD CUTTING DEVICE WHICH CAN TURN OVER AND TRANSFER EXTRUSION DISCS CUT OFF THE EXTRUSION DISCARD

[75] Inventor: Otto Behrendt, Dusseldorf-Eller, Germany

[73] Assignee: Schloemann Aktiengesellschaft, Dusseldorf, Germany

[22] Filed: Aug. 7, 1973

[21] Appl. No.: 386,436

[30] Foreign Application Priority Data
Aug. 11, 1972 Germany............................ 2239543

[52] U.S. Cl...................... 83/161, 83/420, 83/421, 83/569, 83/856, 83/923, 83/925 R
[51] Int. Cl............................................. B23d 33/00
[58] Field of Search............ 83/161, 569, 420, 421, 83/856, 923, 925 R

[56] References Cited
UNITED STATES PATENTS
3,457,642   7/1969   Steer et al......................... 83/161 X
3,736,823   6/1973   Dingler............................. 83/569 X Primary Examiner—Frank T. Yost
Attorney, Agent, or Firm—Holman & Stern

[57] ABSTRACT

A horizontal extrusion discard cutting device has a cutter head and a moving cutter ram which gives a shear cut in order to separate the extrusion discard into an extrusion disc and a billet discard. If the extrusion press is using flat billets, the flat extrusion discards are supplied to the cutting device in a vertical position. According to the invention, the vertical, flat extrusion disc from the cut, vertical, flat extrusion discard is moved by the cutter after cutting, against slight lateral resistance, against a vertical turn-over member, the extrusion disc is retained against the vertical turn-over member by a nose on a lower, horizontal part of the turn-over member and by a spring-biased roller for the upper part of the extrusion disc, the turn-over member is mounted on a shaft which is pivotally supported in the lower zone of the cutting head, and the shaft is then pivoted through 90° to bring the extrusion disc into a horizontal position.

9 Claims, 6 Drawing Figures

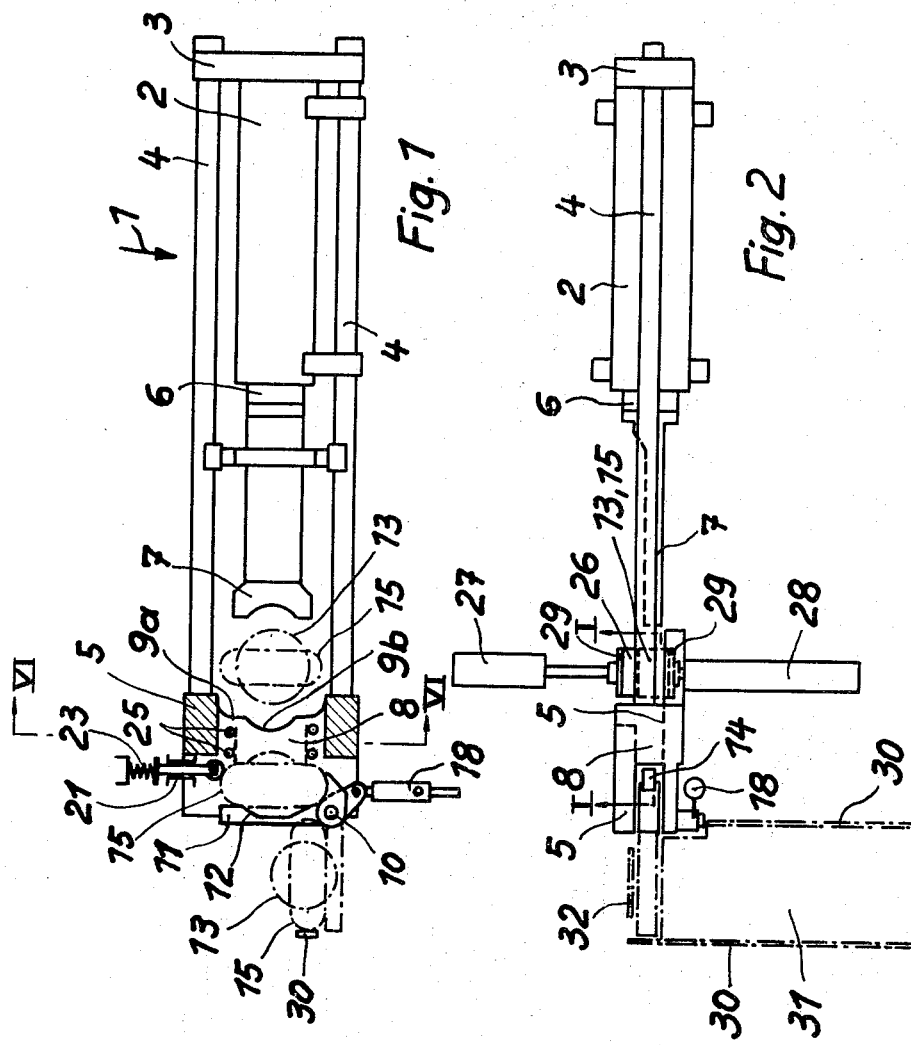

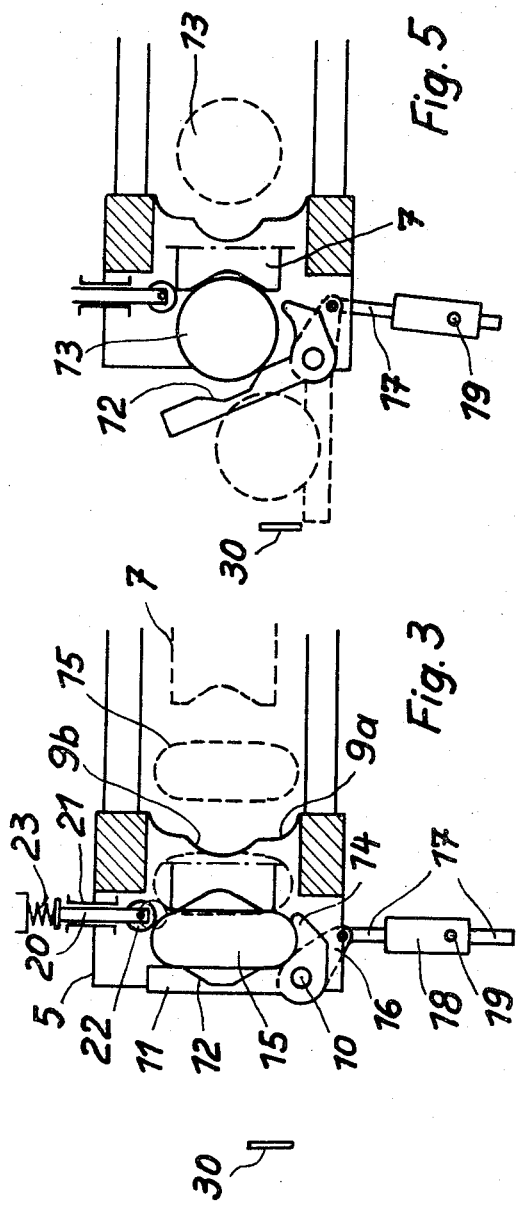
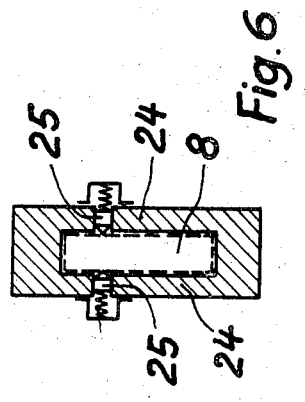
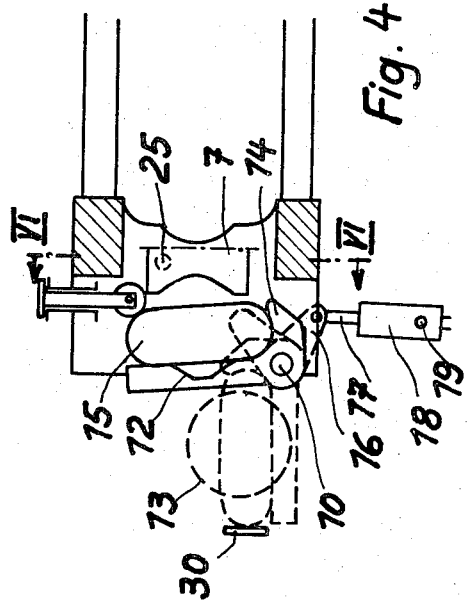

HORIZONTALLY ACTING EXTRUSION DISCARD CUTTING DEVICE WHICH CAN TURN OVER AND TRANSFER EXTRUSION DISCS CUT OFF THE EXTRUSION DISCARD

BACKGROUND OF THE INVENTION

This invention relates to a cutting device for cutting extrusion discards.

When using an extrusion press to extrude for instance aluminium to make either tubes or sections, a heated billet is placed in an extrusion container, an extrusion disc (which may be termed an extrusion slug) is placed behind the billet and an extrusion ram is extended to bear against the extrusion disc and force the material of the billet through a die in front of the container. The extrusion disc prevents the rear end of the billet sticking to the ram, but the extrusion disc itself normally sticks to the rear end of the billet. When the extrusion ram has come to the end of its travel, the extruded material is cut off, leaving a butt or extrusion discard formed by the rear end of the billet, called the billet discard, to which is stuck the extrusion disc. It is normal practice to pass the extrusion discard to a cutting device, for instance using two opposed jaws for engaging opposite axial end faces of the extrusion discard when the extrusion discard is near the axis of the extrusion press, carrying the extrusion discard to the cutting device, and positioning the extrusion discard correctly in the cutting device. In the cutting device, the extrusion disc is separated from the billet discard, usually by shearing, and the extrusion disc can then be re-used.

In the course of the development of horizontal extrusion presses, more particular for aluminium, billets of almost rectangular cross-section are now being used as well as the usual round (cross-section) billets; the almost rectangular cross-section billets are termed flat billets and enable the same press with the same specific internal pressure in the billet container to produce broader flat sections than was possible using round billets.

Round billets and extrusion discs can be more easily handled than flat ones. This also applies to the delivery of the extrusion discard from the press to the cutting device for separation of the extrusion disc from the billet discard. While round billets or extrusion discs can be moved some distance by rolling, this is not possible for flat billets and extrusion discs. Handling of flat and round billets in the same extrusion press is also made difficult by the weight of such billets since the demand for the alternative use of round and flat billets in the same presses usually arises only for heavy presses.

The auxiliary devices on such presses should therefore be arranged as far as possible so that the billets, extrusion discs and billet discards can be handled in a simple manner.

The present invention particularly relates to a cutting device for cutting at least flat billet extrusion discards which are vertical, that is to say on edge, using a horizontally movable cutter, thereby separating the extrusion discard into a vertical, flat extrusion disc and a billet discard.

THE INVENTION

The vertical, flat extrusion disc from the cut, vertical, flat extrusion discard is adapted to be moved by the cutter after cutting from the vertical billet discard in the vertical position, against slight lateral resistance, against a vertical turn-over member, means being provided to retain the flat extrusion disc against the vertical turn-over member, namely a nose on a lower, horizontal part of the turn-over member and a spring-biased roller for the upper part of the flat extrusion disc; the turn-over member is mounted on a shaft which is pivotally supported in the lower zone of the cutting device and can be pivoted by means of a power unit through 90° to bring the extrusion disc into a horizontal position.

The turn-over member, which can be pivoted through 90°, has its pivoting speed defined by the power unit for moving the turn-over member. In general, the turn-over member will swing down about an axis running through its bottom part and will swing away from the cutter. The flat extrusion disc, which has been cut from the billet discard while in a vertical position, is pushed or slid against the turn-over member by means of the cutter. At this position, it is automatically retained in its vertical, previously unstable but now stable, position, its lower part being retained by the turn-over member nose and its upper part by the spring-biased roller. The spring-biased roller acts on that side of the top rounded part of the vertical, flat extrusion disc which faces away from the turn-over member. After this stable vertical position has been obtained, the flat extrusion disc is moved from the vertical to the horizontal position.

The cutting device of the invention can be arranged for cutting both flat and round extrusion discards into extrusion discs and billet discards without any resetting, and can be arranged such that the extrusion discards are correctly positioned in the cutting device and the cut extrusion discs are removed in a suitable manner, thereby ensuring a trouble-free extrusion cycle.

To enable the cutting device and particularly the turn-over member to be used for normal round extrusion discs as well as the vertical, flat extrusion discs, the side of the main part of the turn-over member which faces the cutter when the turn-over member is vertical may have a polygonal or prismatic recess for accommodating round extrusion discs.

The cutting device may have a double-acting hydraulic piston-cylinder unit as its drive means for moving the turn-over member, the piston-cylinder unit having a restrictor which can be arranged to interconnect the two cylinder spaces of the hydraulic unit; the hydraulic unit may have a piston rod which is hinged to a lever either mounted on the turn-over member or rigid with a shaft to which the turn-over member is fixed.

Since the diameter of the round extrusion disc is greater than the thickness of the flat extrusion disc, the round extrusion disc will reach the turn-over member before the cutter has reached its end position. Until this limiting position is reached, the turn-over member yields against the resistance of the restrictor. In the end position of the cutter, the turn-over member may be moved into its horizontal position by changing over the control valves of the piston-cylinder unit.

The means for engaging the extrusion disc as it is pushed by the cutter and thereby for applying slight resistance to the motion of the extrusion disc may comprise opposed, spring-biased thrust bolts. If the cutter is a shearing ram which co-acts with a fixed extrusion discard holder having a horizontal passage through which the extrusion disc is pushed by the shearing ram after making the cut, the engaging means may be on the vertical sides of the passage for engaging the axial end faces of the extrusion disc.

In the construction referred to above with a horizontal passage through the extrusion discard holder, the turn-over member will normally be at the opposite end of the passage to the shearing ram.

BRIEF DESCRIPTION OF THE DRAWINGS

One embodiment of the invention will be particularly described, by way of example, with reference to the accompanying drawings, in which:

FIG. 1 is a side view (partly in vertical section along the line I—I of FIG. 2) of a horizontal cutting device for cutting an extrusion discard delivered from an extrusion press;

FIG. 2 is a plan view of the cutting device;

FIG. 3 is a vertical section, on an enlarged scale, of the left-hand part of the cutting device, after cutting off a vertical, flat extrusion disc;

FIG. 4 is a section corresponding to that of FIG. 3, but taken when the turn-over member with the flat extrusion disc begins to swing down;

FIG. 5 is a section corresponding to that of FIG. 3, but showing a round extrusion disc; and FIG. 6 is a vertical section, on an enlarged scale, along the line VI-VI of FIGS. 1 and 4.

DESCRIPTION OF PREFERRED EMBODIMENT

The cutting device 1 comprises a cutting cylinder 2 connected by a cross member 3 and tie rods 4 to a cutting head 5 which is constructed as a work holder. A cutting piston 6, whose end face carries a cutting ram 7, slides in the cutting cylinder 2. The cutting head 5 is provided with a cutting passage 8. The end faces of the cutting head 5 which are nearest to the cutting ram 7 are provided with recesses 9a for a flat extrusion discard and 9b for a round extrusion discard.

The left-hand lower end of the cutting head 5 is attached to a shaft 10 on which a turn-over member in the form of a plate 11 is mounted, the turn-over plate 11 forming the left-hand termination of the cutting passage 8. The side of the turn-over plate 11 which, when the turn-over plate is vertical, is nearest to the cutting ram 7, is provided with a prismatic recess 12 adapted reliably to retain a round extrusion slug or disc 13. A nose 14, which rises slightly, is provided on a projecting part of the turn-over plate 11 which is horizontal when the turn-over plate is vertical, for retaining a flat extrusion slug or disc 15 that has been sheared off when in the vertical position.

A lever 16 (FIGS. 3 and 4) is mounted on the shaft 10, the free end of the lever 16 being pivoted to a piston rod 17 of a double-acting hydraulic piston-cylinder unit 18. The unit 18 in turn is pivotally supported by means of trunnions 19 in a bearing device which is not shown but is mounted either on the cutting device 1 or on its bed or foundation. The two cylinder spaces of the piston-cylinder unit 18 communicate with each other through the conventional supply lines and can also communicate with each other directly through a restrictor (not shown) and a stop valve (not shown) in series with one another. A suitable restrictor and valve are shown as items 28 and 15 of FIG. 1 of U.S. application Ser. No. 328,277 filed Jan. 31, 1973/British Pat. application No. 4638/73. The unit 18 may be held stationary or moved up or down (anticlockwise or clockwise pivoting of the lever 16) by means of a three-position valve (not shown).

The turn-over plate 11 can be swung anti-clockwise through 90° by means of the hydraulic unit 18 so that the flat extrusion slug 15 which bears at or on the turn-over plate 11, can be swung from the vertical into the horizontal position.

A vertical tappet 20 is guided in guides 21 in the upper zone of the cutting head 5 (FIG. 3), the lower end of the tappet supporting a roller 22. When a flat extrusion slug 15 is in the position shown in FIG. 3, the thrust of a spring 23 keeps the roller 22 in a position in which the lower edge of the roller 22 is below the rounded top edge of the vertical, extrusion slug 15 so that the roller 22 thrusts the top part of the extrusion slug 15 against the turn-over plate 11.

Oppositely disposed spring-biased thrust bolts 25 (FIG. 6) are provided in the upper zone of walls 24 in the cutting passage 8, the ends of the bolts 25 projecting slightly into the cutting passage 8 and bearing on the external surfaces of the flat extrusion slug 15 that has been cut from the billet discard 26 when the extrusion slug 15 is pushed by the cutting ram 7 against the turn-over plate 11.

Oppositely disposed and counter-acting hydraulic piston-cylinder units 27 and 28 are provided to introduce the appropriate extrusion discard (which comprises the billet discard 26 and the round or flat extrusion slug 13 or 15) into the cutting device 1; the units 27, 28 hold the extrusion discard axially between clamping plates 29 which are mounted on the ram pistons. The extrusion discard is moved into the correct position in front of the cutting ram 7 in the cutting device by supplying hydraulic fluid to the unit 27 and allowing hydraulic fluid to flow from the unit 28.

The operation of the cutting device with the turn-over plate is as follows:

The extrusion discard is transferred by an extrusion discard delivery device (not shown) from the extrusion press to the cutting device 1; in the cutting device 1, the discard is gripped along its axis by the two facing clamping plates 29 and is moved until the extrusion slug 13 or 15 is positioned in front of the cutting ram 7; to this end, the hydraulic unit 27 exerts a larger force than the hydraulic unit 28 so that the extrusion discard is brought into the line of action of the cutting device. If the extrusion discard is flat, it is kept vertical.

If the extrusion discard is flat, the cutting ram 7 then moves to the left until the extrusion discard bears on the recess 9a in the cutting head 5. The extrusion slug 15 is separated from the billet discard 26 by the cutting ram 7 and is thrust into the cutting passage 8, the vertical position of the extrusion slug being maintained by the co-operation of the spring-biased thrust bolts 25 until the extrusion slug 15 is flat against the turn-over plate 11 with the lower part of the extrusion slug 15 upon the nose 14; as the extrusion slug 15 is moved to the left, its rounded upper edge initially thrusts the spring-biased roller 22 upwardly and, when the extrusion slug 15 bears upon the turn-over plate 11, the roller 22 drops down and presses against the right-hand upper side of the extrusion slug 15 to keep the extrusion slug against the turn-over plate 11. The extrusion slug is now in the position shown in FIG. 3.

The lower cylinder space of the double-acting hydraulic unit 18 is then pressurized and the hydraulic unit swings the turn-over plate 11 and the flat extrusion slug 15 through 90° to the left, down into the horizontal position (see FIG. 4). In this position, the left one of two guide strips 30, which are disposed on the right and left of a guideway 31 shown in dash-dot lines in FIG. 2, engages the flat extrusion slug 15 and the extrusion slug is displaced by means of a slide 32 along the guideway 31 and is returned to the extrusion press.

The round extrusion slug 13 has a larger diameter than the thickness of the flat extrusion slug 15. Its edge therefore contacts the turn-over plate 11 when the cutting ram has not yet reached its left-hand limiting position. At the beginning of the cutting ram motion, the stop valve referred to above is opened, interconnecting the two cylinder spaces of the ram 18 through the restrictor referred to above. This causes the turn-over plate 11 to swing anti-clockwise under the thurst of the cutting ram 7 when the extrusion 13 contacts the turn-over plate 11, until the cutting ram 7 has reached its left-hand limiting position. The extrusion slug 13 is now in the position shown in FIG. 5.

The swing-down motion of the turn-over plate 11 is then completed as in the case of the flat extrusion slug 15. As the turn-over plate 11 continues to swing, the round extrusion slug 13 first securely bears upon the nose 14 and on the lower edge of the prismatic recess 12 since its centre of gravity is already to the left of the nose 14. As the turn-over plate 11 continues to move, the round extrusion slug 13 finally rolls into the prismatic recess 12 which prevents the extrusion slug rolling off when the turn-over plate 11 is horizontal.

I claim:

1. A cutting device for cutting at least vertical, flat billet extrusion discards coming from a horizontal extrusion press and thereby separating each extrusion discard into a vertical, flat extrusion disc and a billet discard, the cutting device comprising:

a horizontally-movable cutter for moving between first and second end positions and cutting said extrusion discard, and, while said extrusion disc remains vertical, for pushing said extrusion disc horizontally after cutting said extrusion discards;

means for engaging said extrusion disc as said extrusion disc is pushed by said cutter, to apply slight resistance to the motion of said extrusion disc;

a turn-over member which has a main part and a projecting part adjacent the bottom of said main part when said main part is vertical, said turn-over member being movable through about 90° thereby moving said main part from a vertical position to a horizontal position to turn said extrusion disc through about 90°, in its vertical position, said main part being located adjacent said second end position of said cutter, whereby said vertical, flat extrusion disc is thrust against said main part by said cutter after cutting, and said projecting part projecting generally towards said cutter and rising slightly when said main part is vertical so as to engage under the bottom part of said vertical, flat extrusion disc and retain said extrusion disc against said main part;

drive means for turning said turn-over member through about 90°; and a generally downwardly-biased member for engaging the top, rounded part of said vertical, flat extrusion disc and holding said top part against said turn-over member main part when said main part is vertical.

2. The cutting device as claimed in claim 1, for both vertical, flat extrusion discards and round extrusion discards, further characterised in that that side of said turn-over member main part which faces said cutter when said main part is vertical defines a prismatic recess for receiving said round extrusion discs.

3. The cutting device as claimed in claim 1, for both vertical, flat extrusion discards and round extrusion discards, wherein said drive means comprises a double-acting hydraulic piston-cylinder unit having two cylinder spaces, and a restrictor and valve means for interconnecting said cylinder spaces.

4. The cutting device as claimed in claim 2, wherein said drive means comprises a double-acting hydraulic piston-cylinder unit having two cylinder spaces, and a restrictor and valve means for interconnecting said cylinder spaces.

5. The cutting device as claimed in claim 1, wherein said engaging means comprises opposed, spring-biased thrust bolts for engaging the axial end faces of said extrusion disc.

6. The cutting device as claimed in claim 2, wherein said engaging means comprises opposed, spring-biased thrust bolts for engaging the axial end faces of said extrusion disc.

7. The cutting device as claimed in claim 3, wherein said engaging means comprises opposed, spring-biased thrust bolts for engaging the axial end faces of said extrusion disc.

8. The cutting device as claimed in claim 1, wherein said cutter is a shearing ram, said cutting device comprising a fixed extrusion discard holder for co-acting with said shearing ram to shear said extrusion discard, said discard holder defining a horizontal passage therethrough, whereby said extrusion disc is pushed through said passage by said shearing ram after making the cut, said engaging means being on vertical internal sides of said passage for engaging axial end faces of said extrusion disc, and said turn-over member being at the opposite end of said passage to said shearing ram.

9. The cutting device as claimed in claim 1, and further comprising two opposed jaws for engaging opposite axial end faces of said extrusion discard when said extrusion discard is adjacent the axis of said extrusion press, and for positioning said extrusion discard for cutting in said cutting device.

* * * * *